United States Patent [19]

Trahan et al.

[11] Patent Number: 4,876,017

[45] Date of Patent: Oct. 24, 1989

[54] USE OF POLYALPHALOLEFIN IN DOWNHOLE DRILLING

[76] Inventors: David O. Trahan, Rte. 2, Box 2210, Abbeville, La. 70510; Michael B. Faulk, Rte. 2, Box 92, Kaplan, La. 70548

[21] Appl. No.: 145,149

[22] Filed: Jan. 19, 1988

[51] Int. Cl.$^4$ .......................... C09K 7/06; C09K 7/02; E21B 31/03

[52] U.S. Cl. ................................ 252/8.51; 252/8.511; 252/8.515; 252/8.551; 166/301

[58] Field of Search ............... 252/8.515, 8.511, 8.551; 585/3, 18; 166/301

[56] References Cited

U.S. PATENT DOCUMENTS

| | | | |
|---|---|---|---|
| 2,500,163 | 3/1950 | Garwood | 585/18 |
| 3,108,068 | 10/1963 | Weiss et al. | 252/8.515 |
| 3,298,954 | 1/1967 | Brown | 585/3 |
| 3,396,105 | 8/1968 | Burdyn et al. | 252/8.515 X |
| 4,263,465 | 4/1981 | Sheng et al. | 585/18 |
| 4,282,392 | 8/1981 | Cupples et al. | 585/18 X |
| 4,436,636 | 3/1984 | Carnicom | 252/8.551 X |
| 4,464,269 | 8/1984 | Walker et al. | 252/8.551 |
| 4,502,963 | 3/1985 | Harmon | 252/8.511 |
| 4,525,285 | 6/1985 | Son et al. | 252/8.515 |
| 4,587,368 | 5/1986 | Pratt | 585/525 X |
| 4,652,385 | 3/1987 | Cohen | 252/49.8 X |

FOREIGN PATENT DOCUMENTS

WO8302949 9/1983 PCT Int'l Appl. ............. 252/8.515

*Primary Examiner*—John F. Terapane
*Assistant Examiner*—Gary Geist

[57] ABSTRACT

Composition of matter in the present invention relates to the application of a synthetic hydrocarbon compound, such as a polyalphalolefin, which may be combined with emulsifiers and thinners (functional additives), at a ratio of approximately 9:1, to serve as a downhole lubricant which is non-toxic and presents no destruction to marine life. In addition, the polyalphalolefin may be used at a higher ratio of the polyalphalolefin to functional additives, to function as a spotting fluid for the removal of lodged tools downhole, exhibiting the same non-toxic qualities as when it is utilized as a lubricant.

9 Claims, No Drawings

4,876,017

USE OF POLYALPHALOLEFIN IN DOWNHOLE DRILLING

BACKGROUND OF THE INVENTION

1. Field of the Invention

The present invention relates to downhole lubricants and spotting fluids. More particularly, the present invention relates to the use of a synthetic hydrocarbon compound, in particular polyalphalolefin delivered downhole as a lubricant having improved performance and lower toxicity levels than other non-synthetic oil based fluids, used particularly for preventing sticking of the drill bit, or as a spotting fluid for dislodging a bit lodged in the formation.

2. General Background

In the drilling of oil wells, wherein a drill bit at the end of a rotating drill string, or at the end of a motor drill, it is very common that as the bit is rotated through the formation for the drilling of the well, that at certain depths in the formation, the drill bit may have a tendency to become lodged within the formation and therefore disrupt drilling, or the drill bit does in fact lodge itself within the formation and results in shutting down the well.

In the present state of the art, in order to prevent the possibility of a drill bit being lodged within the formation, there are numerous fluid which are pumped downhole in order to attempt to prevent such an eventuality, the most common being vegetable oil, mineral oil, and diesel oil as the base oils, in combination with emulsifiers and thinners (functional additives), as the lubricating combination, or the spotting fluid combination if in fact the bit has become lodged and must be dislodged.

Crude and refined oils were used as early as the 1920's to drill troublesome formations, free stuck pipe, and as completion and packer fluids. Later developments saw the use of No. 2 diesel oil as a common additive to mud systems. More recent environmental concerns over the toxicity of diesel oils required a base fluid change to less toxic refined mineral oils. Current industry requirements in offshore drilling are to have non-toxic fluids that can pass discharge guidelines as specified by the EPA Drilling Fluids Toxicity (reference).

Current oil based drilling fluid lubricants and spotting fluids are based on refined mineral oils and processed vegetable oils along with emulsification and dispersant additive packages.

Overall, these types of oils suffer from many drawbacks, the most pertinent being the fact that the oil is highly toxic to marine life. For example, should the oil in an offshore drilling operation spill over into the water, it has been determined that the mineral oil or vegetable oil, due to its heavy oily nature, will in effect coat the gills of marine animals and destroy valuable marine life. In fact, the Environmental Protection Agency has taken steps to assure that these types of oil are used under very stringent regulations during offshore drilling, and for the most part, in all likelihood should not be used at all. Vegetable oils have been used as substitutes offering a non-toxic alternative but have not proven to be effective performer in this application.

SUMMARY OF THE PRESENT INVENTION

The composition of matter in the present invention relates to the application of a synthetic hydrocarbon compound, such as a polyalphalolefin, which may be combined with emulsifiers and thinners (fatty acids), in naming ratios of 0.1% to 99.9%, to serve as a downhole lubricant in offshore drilling which is non-toxic and presents no destruction to marine life. In addition, the polyalphalolefin may be used at a higher ratio of the polyalphalolefin to functional additives, to function as a spotting fluid for the removal of lodged tools downhole, exhibiting the same non-toxic qualities as when it is utilized as a lubricant.

It is of course understood that the lubricant and spotting fluid compositions of this invention may employ a single component of the type specified or any of the various combinations of component mixtures possible. For instance, in addition to compositions of a singly type of polyalphaolefin lubricant fluid the compositions of this invention include mixtures of non-ionic surface active agents and fatty acids as well as a mixture of polyalphaolefin fluids.

The functional purpose of such compositions are as drilling lubricants and spotting fluids used to prevent differential pressure sticking of the drill bit and/or drill string assembly. Differential pressure sticking is briefly described as the situation where by the drill pipe becomes imbedded in the wall mud cake opposite of a permeable zone, the difference between the hydrostatic and formation pressures holds the pipe in place and is termed sticking pipe.

Therefore, it is a principal object of the present invention to provide a synthetic hydrocarbon, more particularly, polyalphalolefin, as a lubricant to be administered in downhole drilling offshore for preventing the sticking of downhole tools;

It is a further object of the present invention to provide the application of a polyalphalolefin as a lubricant which is non-toxic to marine life in offshore drilling;

It is a further object of the invention to provide novel improved non-toxic lubricant and spotting fluid compositions, more particularly the novel, use of the synthesized hydrocarbon, polyalphaolefin in the manufacture of such compositions; and It is a further object of the present invention to provide a polyalphalolefin in combination with additives at a particular ratio to function as a spotting fluid and likewise be non-toxic to marine life.

DETAILED DESCRIPTION OF THE PREFERRED EMBODIMENT

In the preferred embodiment, the combination of matter of the present invention comprises a synthetic hydrocarbon, more particular polyalphalolefin, in a liquid state to be administered into a oil well bore hole in order to prevent the probable sticking of a downhole tool, more particularly, drill bits. Furthermore, the polyalphalolefin of the present invention, in its use as a lubricant downhole, may be combined with additives, such as thinners or emulsifiers, generally known as fatty acids, to provide a more stable pH factor in the use of the combination of matter downhole.

The present invention is based on the discovery that the use of the synthetic hydrocarbon, polyalphaolefin in drilling fluid lubricants and spotting fluids are highly effective with a low order of toxicity.

Polyalphaolefin synthetic hydrocarbons are chemically pure, highly defined liquid polymers quite unlike the complex mixtures of hydrocarbons that comprise mineral oils. They are formed by the oligomerization of normal alpha olefins, which can be derived from ethylene. By altering the degree of oligomerization the properties of the fluid can be modified. The olefin oligomers are subsequently hydrogenated to lend stability to the molecule. Since the polyalphaolefin contain only carbon and hydrogen and conform substantially to one kind of structure, the properties of the fluid are uniform and predictable. The various polyalphaolefins used in this invention range from a 2 centistoke to a 10 centistoke viscosity range.

It is foreseen, in the use of the preferred embodiment of the present invention, the polyalphalolefin would be utilized particularly in offshore applications or environmentally sensitive areas, in view of the fact that the polyalphalolefin, even as a lubricant, is completely nontoxic to marine life, and therefore offers no threat in its offshore application should a spill occur.

In addition, the polyalphalolefin in the present invention when utilized in a particular ratio with emulsifiers or thinners, or in face in its pure state, may be utilized as a spotting fluid. Such a fluid would be of the type pumped downhole in greater quantities than a lubricant in order to dislodge previously lodged bits. In the present state of the art, the fluids which are utilized as spotting fluids such as mineral oil or vegetable oil, are toxic to marine life and must undergo rigorous EPA standards.

The important feature of its application downhole and more particularly offshore, is in fact its non-toxic qualities. In several tests conducted by independent laboratories, it has been found that the lubricating polyalphalolefin, sold under the trademark of COASTALUBE, in a tests conducted on or about Nov. 23, 1987, offers the following results:

TEST I

The purpose of the test was to provide approximate bioassay data for Coastal Chemical Company on a drilling fluid containing Three (3%) Percent by volume polyalphalolefin (COASTALUBE). Custody transfer of the sample occurred on Nov. 17, 1987 at WTL, the drilling fluid was immediately placed in a walk-in cooler at 4° C. A 96 hour range finder was run on Nov. 18, 1987–Nov. 22, 1987.

| BASE DRILLING FLUID FROM ML BARIOD MATERIALS | |
|---|---|
| Prehydrated Aquagel | 20 lb/bbl |
| Chrome Free Ligno (QB II) | 4 lb/bbl |
| Simulated Drilling Solids Martin #5 Ball Clay | 20 lb/bbl |
| Caustic Soda to pH | 9.5-10 |
| Drispac, reg. | 0.5 lb/bbl |
| Cellex, reg. | 0.5 lb/bbl |
| Soda Ash | 0.5 lb/bbl |
| Coastalube | 3 Vol. % |

SUMMARY
APPROXIMATE $LC_{50}$ TOXICITY RESULTS
Moving Average Method APPROXIMATELY 96 hr. $LC_{50}$

| DRILLING FLUID, ppm | | 95% CONFIDENCE LEVEL | |
|---|---|---|---|
| | | LOWER | UPPER |
| UNCORRECTED | 223,606 | 100,000 | 500,00 |
| CORRECTED FOR CONTROL MORTALITY | 235,510 | 140,821 | 454,376 |
| REFERENCE TOXICANT, ppm | 15.6 | 14.5 | 16.9 |

| DRILLING FLUID SSP CONCENTRATION DATA | | |
|---|---|---|
| TEST CONCENTRATION (ppm SPP) | TOTAL NUMBER MYSIDS | |
| | EXPOSED | SURVIVED |
| CONTROL | 10 | 9 |
| 10,000 | 10 | 10 |
| 50,000 | 10 | 10 |

| -continued | | |
|---|---|---|
| 100,000 | 10 | 10 |
| 500,000 | 10 | 0 |
| 1,000,000 | 10 | 0 |

Complete test results and calculations may be found in the Experimental Details section.

CONCLUSION

This drilling fluid containing Coatalube 3% by vol. has an approximate 96 hour $LC_{50}$ of about 22% SPP or greater than the 3.0% minimum SPP specified in the NPDES permit. This is only an approximate $LC_{50}$ obtained from a 96 hour range finder.

RECOMMENDATIONS

To obtain a more accurate $LC_{50}$ value, a 96 hour acute toxicity test is recommended.

EXPERIMENTAL DETAILS

The drilling fluid has a pH of 11.45 and did not emit a foul odor. Black spots were not present on the container wall. The sample was identified as follows:

COASTAL CHEMICAL COMPANY BASE DRILLING FLUID CONTAINING COASTALUBE 3% VOL.

The drilling fluid was placed in cold storage upon arrival at 4° C WTL's walk-in-cooler. The drilling fluid was prepared for biological testing according to EPA protocol. The drilling fluid was thoroughly homogenized for 30 minutes with a high shear mixer. The homogenized material was then combined with artificial seawater (salinity-20ppt) in a 1:9 ratio of volume. The drilling fluid-seawater mixture, which was characterized by a pH of 8.05, was mixed for 5 minutes and allowed to settle for 1 hour. During the 5 minute mixing period, the pH was adjusted with 0.5ml of 6N HCl to within =0.2 units of the seawater (pH - 7.8). Following the settling period, the suspended particulate phase (SSP) was carefully decanted. Measurement of the pH, dissolved oxygen concentration, and temperature was made during a brief mixing period. The SPP had a pH of 7.95 and was adjusted with 0.5ml of 6N HCl to pH 7.80, a dissolved oxygen concentration of 7.1 ppm a temperature of 20°. Mysids (*Mysiodopsis bahia*) used as test organisms were 4–6 days old. The test animals were cultured in WTL's bioassay facilities using brood stock originally purchased from commercial suppliers. The tests was conducted at 20° C.-2° C. using artificial seawater (Hawaiian Marine Mix) adjusted to a salinity of 20 parts per thousand (ppt) - 2 ppt. Mysids were fed approximately 50 live Artemia (brine shrimp) nauplii per test animal every 96 hours. Tests were conducted with five concentrations of suspended particulate phase and a control (of seawater only) with 10 mysids randomly distributed among each concentration. Tests were performed in 1770 ml crystallizing dishes which contained 1 liter of test solution. Filtered artificial seawater with a salinity of 20 ppt was used to dilute the suspended particulate phase to test concentrations and as the control solution. A 14-hr light and 10-hr dark photo period was maintained with cool-white fluorescent lights.

Air was supplied to the test chambers by a commercial aquaculture blower and delivered through glass tubing in a rate of between 50 and 140 cubic centimeters per minute. At a minimum, the number of survivors were determined at 0 and 96 hours. Temperature, salinity, dissolved oxygen, and pH were measured daily. The 96 hour reference toxicant test, Sodium Lauryl Sulfate (SLS), for this bioassay was performed according to EPA protocol. The SLS used was obtained from Fisher Scientific and was from their Lot #853661. The $LC_{50}$ obtained with this most recent SLS reference test was 15.6 ppm SLS with 95% CI of 14.5 ppm to 1.69 ppm. Up to this point the mean $LC_{50}$ for SLSL reference toxicant tests run at this lab has been 15.1 with a Standard deviation of 2.7. The $LC_{50}$ of this 96 hour reference toxicant test is within two standard deviations of the mean and therefore can be considered acceptable.

DATA AND RESULTS

Data generated by the 96 hour Range Finder test with mysids are presented in Appendix B. Greater than 90 percent survival occurred in the control exposure. Survival data and a copy of the computer print out for the $LC_{50}$ calculation are included in Appendix A. The 96 hour approximate $LC_{50}$ for this sample of drilling fluid was 223,606 ppm suspended particulate phase (SSP). The 95 percent confidence limits for this approximate LC=value were 100,000–500,00 ppm (SPP).

| REFERENCES |
| --- |
| Stephan, C.E. 1983. Computer program for calculation of $LC_{50}$ values. U.S. Environmental Protection Agency, Duluth, Minnesota. |
| U.S. Environmental Protection Agency, 1985. |
| Draft Methodology: Drilling Fluids Toxicity Test. Industrial Technology Division of the Office of Water, EPA, Washington, D.C. FR50, FR34592, August 26, 1985. Appendix 3 to the proposed oil and gas extraction point source category guidelines and new source standards. |

TEST II

An earlier test was conducted on September 2, 1987 for approximating $LC_{50}$ of a base mud containing 10% of Sample #3 spotting fluid. The results of that test are as follows:

INTRODUCTION

The purpose of this test was to provide approximate $LC_{50}$ data for Coastal Chemical Company on a base mud containing 10% by volume of Sample #3 spotting fluid. Custody transfer of Sample #3 occurred on Aug. 27, 1987 at WTL. The mud was mixed according to specification on Aug. 28, 1987, hot rolled 16 hrs. at 150° F., immediately placed in a walk-in cooler at 4° C. A 96 hour range finder was run on Aug. 29, 1987 - Nov. 2, 1987.

| BASE MUD PREPARED FROM NL BARIOD MATERIALS. | |
| --- | --- |
| Prehydrated Aquagel | 20 lb/bbl |
| Chrome Free Ligno (QB II) | 4 lb/bbl |
| Simulated Drilled Solids | |
| Martin #5 Ball Clay | 20 ib/bbl |
| Caustic Soda to pH | 9.5-10 |
| Drispac, reg. | 0.5 lb/bbl |
| Cellex, reg. | 0.5 lb/bbl |
| Soda Ash | 0.5 lb/bbl |
| Sample #3 (Spotting Fluid) | 10 vol % |

This mud was sent with two others. The approximate $LC_{50}$ values for these samples will be reported separately.

SUMMARY
$LC_{50}$ TOXICITY RESULTS

| | | 95% CONFIDENCE LEVEL | |
| --- | --- | --- | --- |
| Moving Average Method | 96 hr. $LC_{50}$ | LOWER | UPPER |
| DRILLING FLUID, ppm | | | |
| UNCORRECTED (Sample #3) | 109,995 | 66,024 | 179,782 |
| UNCORRECTED (Base Mud) | 1,000,000 | — | — |
| CORRECTED FOR CONTROL MORTALITY | | | |
| (Sample #3) | 109,995 | 66,024 | 179,782 |
| (Base Mud) | 1,000,000 | — | — |
| REFERENCE TOXICANT, ppm | | | |

| DRILLING FLUID SPP CONCENTRATION DATA | | | | |
| --- | --- | --- | --- | --- |
| BASE MUD TEST CONCENTRATION: TOTAL NUMBER MYSIDS | SAMPLE #3 TOTAL NUMBER MYSIDS | | | |
| (ppm SPP) | EXPOSED | SURVIVED | EXPOSED | SURVIVED |
| CONTROL | 10 | 10 | 11 | 11 |
| 10,000 | 10 | 9 | 10 | 10 |
| 50,000 | 10 | 10 | 10 | 10 |
| 100,000 | 10 | 6 | 10 | 8 |
| 500,000 | 10 | 0 | 10 | 10 |
| 1,000,000 | 10 | 0 | 10 | 10 |

| | SAMPLE #3 | BASE MUD |
| --- | --- | --- |
| TOTAL SUSPENDED SOLIDS, mg/l | 11,795 | 30,359 |
| TOTAL DISSOLVED SOLIDS, mg/l | 12,625 | 29,575 |

Complete test results and calculations may be found in the Experimental Details section.
Sample #3 in a concentration of 10% by volume has an approximate $LC_{50}$ of about 11% SPP or much greater than the 3.0% minimum SPP specified in the NPDES permit.
This is only an approximate LC$_{50}$ obtained from a 96 hour range finder.
RECOMMENDATIONS
To obtain a more accurate LC$_{50}$ value, a 96 hour LC$_{50}$ test is recommended.

EXPERIMENTAL DETAILS

The drilling fluid has a pH of 10.4 and did not emit a foul odor. Black spots were not present on the container walls. The sample was identified as follows:

SAMPLE #3 COASTAL CHEMICAL COMPANY

The drilling fluid was placed in cold storage upon arrival at 4° C. in WTL's walk-in-cooler. The drilling fluid was prepared for biological testing according to EPA protocol. The drilling fluid was thoroughly homogenized for 30 minutes with a high shear mixer. The homogenized material was then combined with artificial seawater (salinity=20ppt) in a 1:9 ratio by volume.

SAMPLE #3

The drilling fluid-seawater mixture, which was characterized by a pH of 9.24, was mixed for 5 minutes and allowed to settle for 1 hour. During the 5 minute mixing period, the pH was adjusted with 1.0 ml of 6N HCl and 0.05 ml 1ON NaOH to within =0.2 units of the seawater (pH - 7.8). Following the settling period, the suspended particular phase (SPP) was carefully decanted. Measurement of the pH, dissolved oxygen concentration, and temperature was made during a brief mixing period. The SPP had a pH of 7.79, a dissolved oxygen concentration of 6.6 ppm, a temperature of 20° C., Total Suspended Solids of 11,795 mg/l and Total Dissolved Solids of 30,359 mg/l.

BASE MUD

The drilling fluid-seawater mixture, which was characterized by a pH of 8.99, was mixed for 5 minutes and allowed to settle for 1 hour. During the 5 minute mixing period, the pH was adjusted with 0.6 ml of 6N HCl and 0.50 ml 10N NaOh to within −0.2 units of seawater (pH - 7.8). Following the settling period, the suspended particulate phase (SSP) was carefully decanted. Measurement of the pH, dissolved oxygen concentration, and temperature was made during a brief mixing period. The SPP has a pH of 8.01 and was adjusted with 0.1 l of 6N NCl to a pH of 7.87, a dissolved oxygen concentration of 6.8 ppm, a temperature of 20° C., Total Suspended Solids of 12,625 mg/l and Total Dissolved Solids of 29,574 mg/l. Mysids (*Mysiodopsis bahia*) used as test organism were 4-6 days old. The test animals were cultured in WTL's bioassay facilities using brood stock originally purchased from commercial suppliers. The test was conducted at 20° C.-2° C. using artificial seawater adjusted to a salinity of 20 parts per thousand (ppt) −2 ppt. Mysids were fed =50 live Artemia (brine shrimp) nauplii per test animal every 24 hours. Tests were conducted with five concentrations of suspended particulate phase and a control (of seawater only) with 60 mysids randomly distributed among three replicates of each concentration. Tests were performed in 1700 ml crystalizing dishes which contained 1 liter of test solution. Filtered artificial seawater with a salinity of 20 ppt was used to dilute the suspended particulate phase to test concentration and as the control solution.

A 14-hr light and 10-hr dark photo period was maintained with cool-white fluorescent lights. Air was supplied to the test chambers by commercial aquarium air pumps and delivered through glass tubing at a rate of between 50 and 140 cubic centimeters per minute. At a minimum, the number of survivors were determined at 0 and 96 hours. Temperature, salinity, dissolved oxygen, and pH were measured daily. The reference toxicant test, Sodium Lauryl Sulfate (SLS), for this bioassay were performed according to EPA protocol. The SLS used was obtained from Fisher Scientific and was from their Lot #853661. The LC$_{50}$ obtained with this most recent SLS reference test was 16.1 ppm SLS was 95% CI of 14.8 ppm to 17.7 ppm. Up to this point the mean LC$_{50}$ for SLS reference toxicant test run at this lab has been 15.2 with a Standard deviation of 3.1. The LC$_{50}$ of this reference toxicant test is within two standard deviations of the mean and therefore can be considered acceptable.

ATA AND RESULTS

Data generated by the acute toxicity test with mysids are presented in Appendix B. Greater than 90 percent survival occurred in the control exposure. Survival data and a copy of the computer print out for the LC$_{50}$ calculation are included in Appendix A.

The approximate LC$_{50}$ for Sample #3 was 109,995 ppm suspended particulate phase (SPP). The approximate LC$_{50}$ for the Base Mud was 1,000,000 ppm suspended particulate phase (SPP). The 95 percent confidence limits for Sample #3 LC$_{50}$ value were 66,024–179,782 ppm (SPP) and values for the Base Mud could not be calculated.

| REFERENCES | |
|---|---|
| Stephan, C.E. 1983. | Computer program for calculation of LC$_{50}$ values. U.S. Environmental Protection Agency, Duluth, Minnesota. |
| U.S. Environmental Protection Agency, 1985. | |
| Draft Methodology: | Drilling Fluids Toxicity Test. Industrial Technology Division of the Office of Water, EPA, Washington, D.C. FR50, FR34592, August 26, 1985. Appendix 3 to the proposed oil and gas extraction point source category guidelines and new source standards. |

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not in a limiting sense.

What is claimed as invention is:

1. A drilling fluid composition of matter for lubricating drill pipe during drilling, the composition of matter comprising:

(a) a water base mud system; and (b) a polyalphaolefin and emulsifier added to the water base mud system as a liquid with the polyalphaolefin in a 2 to 10 centistoke viscosity range.

2. The drilling fluid composition of matter in claim 1, wherein the polyalphaolefin is administered in its liquid state.

3. The drilling fluid composition of matter in claim 1, wherein the drilling fluid composition of matter is non-toxic to marine life.

4. The drilling fluid composition of matter in claim 1, wherein the percentage of polyalphaolefin in the polyalphaolefinemulsifier mixture is 90%.

5. In drilling oil wells, wherein a drill string is rotated in a formation, and the drill string has become stuck, a process of unsticking the drill string, comprising the following steps:
(a) combining a liquid polyalphaolefin, in a 2 to 10 centistoke viscosity range, with an emulsifier;
(b) introducing a volume of the polyalphaolefin emulsifier combination into a borehole containing a volume of water base mud;
(c) circulating the mud containing the polyalphaolefin-emulsifier in a volume sufficient to lubricate the pipe to reduce the friction between the wall of the drill pipe and the formation so that the drill pipe becomes unstuck.

6. The process in claim 5, wherein the polyalphaolefin-emulsifier combination contains 90% polyalphaolefin and 10% emulsifier.

7. The process in claim 5, wherein the polyalphaolefin-emulsifier combination is non-toxic to marine life in its application.

8. A process for unsticking drill pipe when employing a water base mud system, where the drill pipe has become stuck against a formation due to differential pressure between the formation and the drill pipe, the process comprising the following steps:
(a) locating a point downhole where the drill pipe has become stuck against the formation;
(b) combining a liquid polyalphaolefin in a 2 to 10 centistoke viscosity range with an emulsifier; and
(c) introducing a certain volume of the liquid polyalphaolefin-emulsifer combination downhole to the depth of the point of the stuck pipe and in a quantity sufficient to unstick the pipe.

9. The process in claim 8, wherein the polyalphaolefin-emulsifier combination is administered downhole as a spotting fluid to replace the water base mud surrounding the point where the drill pipe is stuck against the formation.

* * * * *